March 1, 1966 C. S. GIBBS 3,237,299
CITRUS FRUIT TOOL CHARACTERIZED BY RIND DISLODGING BLADE
WITH BLUNT EDGES AND SCORING TOOTH
Filed May 18, 1964

Charles S. Gibbs
INVENTOR.

BY *Clarence A. O'Brien*
*and Harvey B. Jackson*
Attorneys ic Office 3,237,299
Patented Mar. 1, 1966

3,237,299
CITRUS FRUIT TOOL CHARACTERIZED BY RIND DISLODGING BLADE WITH BLUNT EDGES AND SCORING TOOTH
Charles S. Gibbs, Cumming, Ga.
(Dogwood Hills, Rte. 1, Buford, Ga.)
Filed May 18, 1964, Ser. No. 368,191
2 Claims. (Cl. 30—24)

The present invention relates to manually usable tools commonly known as peelers and which are designed and structurally adapted to score or sever and, in one manner or another, dislodge and remove the skin, for example, the rind of an orange.

An object of the present invention is to improve upon prior art citrus fruit peelers, for example, the peeler disclosed in a patent granted to Little 2,974,411. Little's peeler causes a half section of the rind or skin about an inch wide, to be pried away from the meat all the way around the same leaving the top half of the rind still connected to the meat along a limited top region. Under the circumstances it is necessary to grasp the top half of the rind with the fingers in one hand and to forcibly pull it off as a one-piece entity. It is an object of the present invention to provide a unique and structurally distinct implement which is characterized by handle and blade portions and wherein the blade portion is non-circular in cross-section, is thick and rigid, has an outer end which is properly curved and oriented in respect to the body part of the blade and wherein the dull cutting edges along the lengthwise sides of the blade facilitate the step of properly positioning and moving the blade (either to the left or right) and, in so doing, to sever the fibers in such a way that the entire semispherical half portion is freed from the fruit proper and can be lifted off as though it were a quickly removable cap.

The herein disclosed peeler or implement is appropriately flattened and carefully tapered with the taper starting at the curvature of the curved part of the blade, the terminal end thereof being convex but blunt and constituting an easy-to-use probe so that it may be forcibly pressed all the way up between the skin or rind and the fruit after the skin has been scored or cut into symmetrical half-portions and so that by taking full advantage of the component features the half-section is dislodged and is capable of being lifted off with requisite nicety.

Experience has shown that a tool constructed precisely in accordance with the concept herein revealed insures a time-saving smoother and pleasing result in that excess rind or skin does not cling to the fruit. Moreover, the fruit is neither squeezed nor undesirably bruised for the reason that the features of the handle and blade portion coordinate their functions and make it unnecessary to exert undue and undesirable pressure against the surface of the fruit during the skin dislodging and freeing step.

In carrying out a preferred embodiment of the invention, the blade is of the desired lengthwise dimension, curvature and shape, has blunt or dull selectively usable lengthwise rind dislodging and freeing edges, has a blunt leading end or beak which can be forcibly shoved to the axial point of the half-cap which is to be freed and removed and is provided on one lengthwise edge with a crosswise oblique angled marginally sharpened scoring tooth, the latter located at the juncture of the handle and blade portions and being thus oriented for either scoring or penetrating and circumferentially separating the orange skin in order to divide the same into semispherical half portions.

These together with other objects and advantages which will become substantially apparent reside in the details of construction and operation as more fully hereinafter described and claimed, reference being had to the accompanying drawings forming a part hereof, wherein like numerals refer to like parts throughout, and in which:

Figure 3:
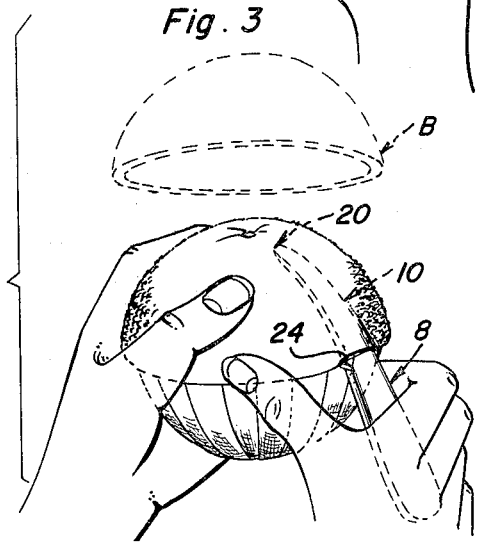
FIGURE 3 is also a view in perspective showing both hands and how they and the implement are used conjointly to accomplish the intact dislodging and removal step.
Figures 4, 5:
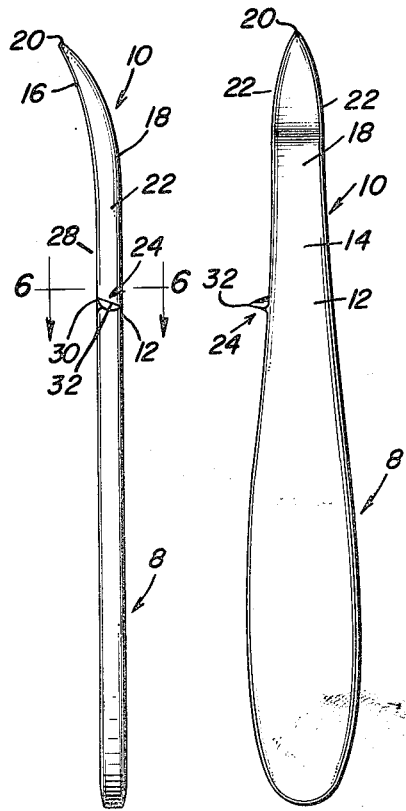
FIGURE 4 is an edge view (approximately full size) showing a peeler constructed in accordance with the principles of the present invention.
FIGURE 5 is a plan view (alternatively, an elevational view) showing the appearance of the component parts when observing the same in a direction from right to left (based on FIGURE 4).

The implement is of one-piece or unitary construction and can be made from a moldable material, an appropriate colorful grade of commercial plastics for example. It comprises a handle 8 which is suitably elongated and is substantially ovate in plan as shown in FIGURE 5. The outer end portion of the handle merges with a tongue-like extension or shank which is gradually tapered and also gradually decreased in cross-sectional thickness and constitutes and provides a probing, dislodging and rind removing blade 10. That portion of the implement denoted at 12 in FIGURE 5 designates the juncture between the handle and blade portion. The handle is substantially straight from end to end. The blade, that is the inner end portion thereof which is denoted at 14 is likewise straight but then is caused to curve, the arc or curvature being of the arcuity shown in FIGURE 4 whereby the inward surface 16 is substantially conformable to the surface of the fruit in the manner shown in FIGURES 2 and 3. This inward surface may be called the concave side. The opposite side 18 is the outward side and is cambered in a longitudinal manner.

Figure 6:
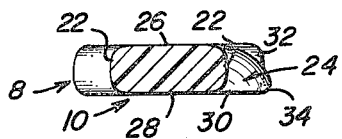
FIGURE 6 is an enlarged cross section taken on the plane of the section line 6—6 of FIGURE 4.

It will be noted that the blade is unique and distinct in that it is gradually decreased in width (see FIGURE 5). It is also gradually decreased in thickness in the direction of the leading or probing end. This end is blunt and convex as denoted at 20 and provides a piloting tip, that is, a tip or neb which can be forced into place in the manner shown for example in FIGURE 2. The longitudinal left and right edge portions of the tapering blade are denoted at 22 and are identical in construction (see FIGURE 6), each being convex. Accordingly, these blunt severing edges are dull, sufficiently so that they do not cut but simply wedge and separate the skin from the fruit by moving the implement through a circumferential path in the manner shown generally in FIGURE 2. One edge portion is provided at the approximate juncture-point 12 with an integral outstanding lug which is denoted generally at 24. This lug is oblique angled in respect to the plane of the generally planar parallel surfaces 26 and 28 (FIGURE 6). Also with reference to FIGURE 6 it will be seen that this lug constitutes a scoring tooth and one marginal edge 30 is straight and flush with the planar surface 28. The other marginal edge 32 is curved and sharpened to provide a cutting edge and a penetrating point at the juncture of the two edges as at 32. The width of the base of the tooth, where it joins the edge 22 is approximately of a dimension which corresponds with the cross-sectional thickness of the blade.

Figure 1:
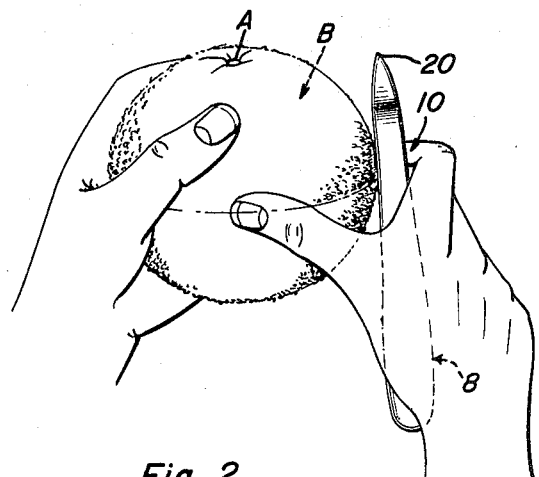
FIGURE 1 is a view in perspective showing an orange being held in the left hand, the tool held in the right hand with the skin or rind scoring tooth applied in a manner to circumferentially score or, alternatively, cut the skin and to thus divide it into potentially removable semispherical half-portions.
Figure 2:
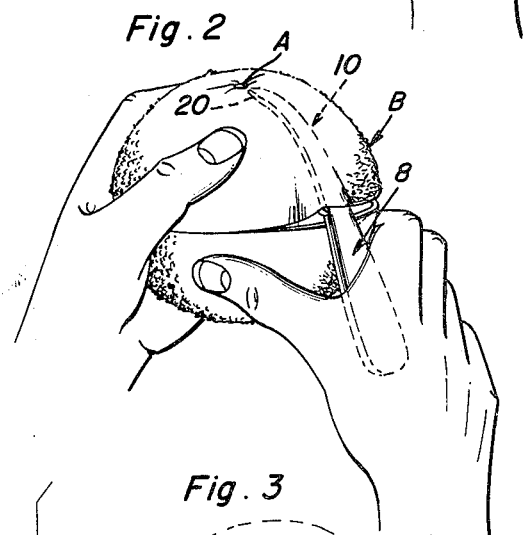
FIGURE 2 is a view similar to and based on FIGURE 1 and which shows the half portion having been cut and which further shows how the elongated slender tapered and curved blade has been shoved between the upper half portion and the fruit with the terminal tip located in proximity to the axial center of the half portion to facilitate removal.

It will be evident from FIGURE 2 that the penetrating and cutting tooth 24 is used in the manner shown in FIGURE 1. As there illustrated the orange or other fruit is held in the left hand and the handle 8 of the implement is grasped between the fingers of the right hand. The point 34 is pressed against the fruit at the approximate central zone shown. Then the tooth is drawn step-by-step around the circumference to score and divide the skin into upper and lower symmetrical halves or half portions. Each half portion is then susceptible of being dislodged and removed by forcing the leading or probing end 20 of the blade up between the skin and the fruit so that the leading end 20 terminates adjacent the axial point A of the half-section B which is being (FIGURE 2) dislodged and readied for intact removal.

It is a matter of common knowledge in the art to which the invention relates that paring, peeling and cutting tools which are hand size and manually used are utilized in slightly different ways. This is to say, one user as a result of trial and error experiment may or may not use the tool in the manner herein shown and described. Experience has shown however, that best results can be attained by holding the fruit in the manner shown in FIGS. 1 to 3 with one hand and holding the instrument or implement in the other hand and as a matter of fact placing the thumb of the right hand on the surface of the skin in a manner to stabilize the handling of the peeler. Then too, it may well be pointed out here that the rounded cutting edge of the blade allows one to penetrate to the most satisfactory depth for varying thickness of rinds and without cutting the fruit. Further, it will help to bear in mind that after the insertion has been made the lever is forced up gradually and gently between the rind and the fruit while turning the fruit until the very tip end 20 is at the top of the fruit as brought out in FIGS. 2 and 3.

It is believed that a careful survey of the views of the drawing and a studied consideration of the same in conjunction with the statement of the objectives and detailed description will enable the reader to obtain a clear and comprehensive understanding of the subject matter of the invention, the features and advantages and manner of handling and using the same. Accordingly, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A manually usable tool expressly designed for removing semispherical half-portions of an orange rind or the like comprising: a rigid plastic one-piece implement embodying an elongated rearward body portion ovate in plan and constituting a handle, and an elongated forward shank fashioned into a rind dislodging blade, a substantial and significant component part constituting the leading end portion of said blade being longitudinally bowed and having a convex rind probing and loosening extremity, the latter having a tip portion which though pointed is nevertheless blunt, the respective longitudinal edges of said blade being rounded and convex in shape both crosswise and lengthwise and significantly dull but nevertheless capable of forcibly severing connecting fibers between the interior of the rind and exterior of the fruit to which the rind is joined, said handle having substantially flat spaced parallel sides, said blade likewise having flattened top and bottom sides constituting uninterrupted extensions of the flat top and bottom sides of said handle, said implement being provided on one longitudinal edge with a relatively short but prominently projecting lug situated at the approximate junctional point between said handle and blade, said lug being fashioned into and constituting and providing a tooth which is adapted to score the rind of the orange circumferentially in a manner to facilitate separation of the rind into bodily removable approximately semispherical half-portions capable of being dislodged when the aforementioned blade is wedged between the rind and fruit and moved circumferentially while the fruit is held with one hand, said tooth having a first marginal edge which is linearly straight, coplanar with an adjacent surface of said blade and has a second marginal edge which is curvilineal and constitutes a skin penetrating and scoring surface.

2. The structure defined in claim 1 and wherein said tooth at the base thereof is of a dimension substantially corresponding to the cross-sectional thickness of said blade, and said cutting edge merging into a proximal planar surface of said blade, said tooth being pitched at an oblique angle transversely of the edge portion on which it is mounted.

References Cited by the Examiner
UNITED STATES PATENTS

| | | | |
|---|---|---|---|
| D. 48,669 | 3/1916 | Davis | 30—356 X |
| 206,707 | 8/1878 | Doane | 30—24 |
| 461,914 | 10/1891 | Hamrick | 30—24 X |
| 1,570,707 | 1/1926 | Ross | 30—356 X |
| 1,982,193 | 11/1934 | Darr | 30—24 |
| 2,309,177 | 1/1943 | Eifler | 30—24 |
| 2,497,342 | 2/1950 | Brustolon et al. | 30—356 X |
| 2,876,487 | 3/1959 | Pasquale | 30—24 X |
| 2,900,717 | 8/1959 | Byrd et al. | 30—24 |
| 3,003,232 | 10/1961 | McDonald | 30—24 |

FOREIGN PATENTS

| | | |
|---|---|---|
| 758,909 | 11/1933 | France. |
| 320,272 | 10/1929 | Great Britain. |

WILLIAM FELDMAN, *Primary Examiner.*

MYRON C. KRUSE, *Examiner.*